United States Patent
Utermoehlen et al.

(10) Patent No.: US 11,118,940 B2
(45) Date of Patent: Sep. 14, 2021

(54) TILT-TOLERANT DISPLACEMENT SENSOR

(71) Applicant: Robert Bosch GmbH, Stuttgart (DE)

(72) Inventors: Fabian Utermoehlen, Lippstadt (DE);
Dayo Oshinubi, Rutesheim (DE);
Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 16/084,178

(22) PCT Filed: Jan. 18, 2017

(86) PCT No.: PCT/EP2017/050988
§ 371 (c)(1),
(2) Date: Sep. 11, 2018

(87) PCT Pub. No.: WO2017/153074
PCT Pub. Date: Sep. 14, 2017

(65) Prior Publication Data
US 2020/0292355 A1      Sep. 17, 2020

(30) Foreign Application Priority Data
Mar. 11, 2016 (DE) ........................ 10 2016 204 016.2

(51) Int. Cl.
*G01B 7/00* (2006.01)
*G01D 5/20* (2006.01)

(52) U.S. Cl.
CPC .................... *G01D 5/202* (2013.01)

(58) Field of Classification Search
CPC .. G01D 5/202; G01D 5/2053; G01D 5/24438; G01D 5/24485; G01D 5/2258; G01B 7/023
See application file for complete search history.

(56) References Cited

U.S. PATENT DOCUMENTS

| | | | |
|---|---|---|---|
| 6,714,004 B2 * | 3/2004 | Jagiella | F15B 15/2846 324/207.16 |
| 6,720,760 B2 * | 4/2004 | Milvich | G01D 5/2086 324/207.17 |

(Continued)

FOREIGN PATENT DOCUMENTS

| | | |
|---|---|---|
| CN | 101275857 A | 10/2008 |
| DE | 10 2004 033 083 A1 | 1/2006 |

(Continued)

OTHER PUBLICATIONS

International Search Report corresponding to PCT Application No. PCT/EP2017/050988, dated Apr. 3, 2017 (German and English language document) (5 pages).

*Primary Examiner* — Thang X Le
(74) *Attorney, Agent, or Firm* — Maginot, Moore & Beck LLP (57) ABSTRACT

A displacement sensor includes an induction element and sensor element. The induction element has an electrically conductive measurement track element extending along a measurement path, and two electrically conductive correction track element positioned adjacent to each other relative to the path. The sensor element is movable relative to the induction element along the measurement track element, and has a measurement coil positioned over the measurement track element and two correction coils positioned adjacent to each other relative to the path. A position change of the measurement coil on the path changes an overlap of the measurement coil and the measurement track element along the path such that an induction of the measurement coil is configured with reference to the position of the measurement coil on the measurement path. Each correction coil is positioned over a respective corrective track element such (Continued)

that an overlap of the correction coil over the respective corrective track element is constant.

10 Claims, 4 Drawing Sheets

(56) References Cited

U.S. PATENT DOCUMENTS

| | | | |
|---|---|---|---|
| 8,710,827 B2* | 4/2014 | Zhitomirsky | G01D 5/204 324/207.17 |
| 2007/0001666 A1 | 1/2007 | Lee | |
| 2009/0174396 A1* | 7/2009 | Howard | G01D 5/2046 324/207.24 |
| 2010/0156402 A1* | 6/2010 | Straubinger | G01D 5/202 324/207.25 |
| 2018/0195880 A1* | 7/2018 | Cook | G01B 3/205 |
| 2020/0300670 A1* | 9/2020 | Cook | G01B 3/004 |

FOREIGN PATENT DOCUMENTS

| | | |
|---|---|---|
| EP | 1 884 749 A1 | 2/2008 |
| JP | H01-058110 U | 4/1989 |
| JP | H07-324948 A | 12/1995 |
| JP | 2001-165603 A | 6/2001 |
| JP | 2006-194720 A | 7/2006 |
| JP | 2007-327940 A | 12/2007 |
| JP | 2013-246051 A | 12/2013 |
| JP | 2015-001375 A | 1/2015 |

* cited by examiner

TILT-TOLERANT DISPLACEMENT SENSOR

This application is a 35 U.S.C. § 371 National Stage Application of PCT/EP2017/050988, filed on Jan. 18, 2017, which claims the benefit of priority to Serial No. DE 10 2016 204 016.2, filed on Mar. 11, 2016 in Germany, the disclosures of which are incorporated herein by reference in their entirety.

The disclosure relates to a displacement sensor and to a method for determining a relative position using this displacement sensor.

BACKGROUND

Rotation angle sensors based on the eddy current principle are known. The measurement signal may be a frequency change in a resonant circuit comprising a measurement coil arranged over an electrically conductive track. The electrically conductive track changes its width along a measurement path such that an overlap between the measurement coil and the electrically conductive track along the measurement path changes. The measurement coil induces an eddy current in the conductive track that leads to an inductance change in the measurement coil.

Such a rotation angle sensor is depicted in DE 10 2004 033 083 A1, for example.

A robust design with regard to tolerances normally requires the use of multiple measurement coils and multiple conductive tracks having, for the most part, an identical geometry but being arranged in a staggered manner along the circumference of the object to be surveyed.

Besides the movement in the direction of measurement (such as a rotation about an x axis, for example), tolerances can result in there being a displacement and in there being changes of distances between the measurement coil and the electrically conductive track (i.e. in there being a movement in the x direction and the z direction). In addition, a tilt about the y axis is possible. A tilt and a change of distance may be particularly critical for the measurement method, since the eddy current effect has a high level of distance dependency.

SUMMARY

Embodiments of the present disclosure can advantageously allow a displacement sensor that is robust with regard to tolerances to be provided.

Concepts concerning embodiments of the present disclosure can be regarded as based on the ideas and insights described below, inter alia.

One aspect of the disclosure relates to a displacement sensor. A displacement sensor may be a linear displacement sensor that can be used to determine a relative position of two components along a straight measurement path. A displacement sensor may also be a rotation angle sensor that can be used to determine a relative rotation of two components in relation to one another about a rotation axis.

According to one embodiment of the disclosure, the displacement sensor comprises an induction element having at least one electrically conductive measurement track element running along a measurement path; a sensor element mobile relative to the induction element along the at least one measurement track element; wherein the sensor element comprises at least one measurement coil arranged over the at least one measurement track element; wherein an overlap between the at least one measurement coil and the at least one measurement track element along the measurement path changes such that an induction of the at least one measurement coil is dependent on a position of the measurement coil on the measurement path.

Further, the induction element has two electrically conductive correction track elements arranged beside one another with reference to the measurement path, and the sensor element has two correction coils, which are arranged beside one another, with reference to the measurement path, over a respective one of the two correction track elements and the overlap of which with the correction track elements along the measurement path is constant.

The induction element may, by way of example, be a (for example flexible) printed circuit board on which the measurement track element and the correction track elements are configured as one or more conductor tracks. This printed circuit board may be arranged on a part whose movement is supposed to be measured. Alternatively, it is possible for the induction element to be provided by the part to be surveyed directly if said part is electrically conductive. The measurement track element may, by way of example, be an elevation on this part. Further, the correction track elements may be directly provided by this part.

The measurement track element(s) and the correction track elements may each be formed by electrically conductive tracks isolated from one another. Alternatively, it is possible for one or more of the measurement track elements and/or correction track elements to be provided by just one electrically conductive track. One or two measurement track elements can, by way of example, be provided by the edges of an electrically conductive track. A correction track can be provided by the middle of an electrically conductive track.

It is possible for a respective conductive track providing a respective measurement track element to be present on the induction element per coil (measurement coil and/or correction coil). Alternatively, it is possible for multiple track elements (measurement track elements and/or correction track elements) to be provided by just one electrically conductive track.

The sensor element may be a printed circuit board in which the measurement coil and/or the correction coils are configured as planar coils. The sensor element can also comprise further components, such as a controller that can induce an alternating current in the coils and/or can measure a frequency of the alternating voltage in these coils, for example.

It is possible for the base areas of the correction coils to be substantially consistent with those of the measurement coils. It is also possible for the correction coils to have a smaller area than the measurement coil(s).

The induction element and the sensor element are mobile relative to one another. By way of example, the induction element may be arranged on a shaft that is rotatable relative to the sensor element. The sensor element and the induction element may also be mounted on parts that are displaceable in relation to one another in relation to the measurement path.

The correction coils can be used to compensate for a tilt in the induction element relative to the sensor element and also a relative change of distance between these two elements of the displacement sensor.

The measurement coil(s) and the correction coils have an alternating voltage applied to them in this case that induces an eddy current in the associated measurement track element (s) and correction track elements, and that therefore changes the inductance of the respective coil (measurement coil or correction coil). The coils may each be connected to a resonant circuit, the frequency of which then changes with the respective inductance. This frequency can be evaluated as a measurement signal of the respective coil.

Since the width of the measurement track element(s) changes along the measurement path, for example, the inductance of the associated measurement coil and hence the associated frequency changes. From the frequency, it is thus possible to infer the position of the measurement coil along the measurement path.

Since the measurement signal is additionally dependent on the distance of the measurement coil from the measurement track element (i.e. a distance in the z direction), tilting or a change of distance can alter the measurement signal, however, this being able to be corrected by means of the correction coils.

The correction coils are arranged beside one another with reference to the measurement path, i.e. along an x direction if the measurement path runs along the y direction. Since the overlap between a correction coil and the associated correction track element is independent of the position on the measurement path, the measurement signal of the correction coil (i.e. the frequency of the alternating voltage produced by the inductance of the correction coil) can be used to infer the distance of the correction coil from the correction track. Based on the distance determined for each correction coil and on the known geometry of the displacement sensor (such as the distance of the correction coils from one another and from the measurement coil(s), for example), it is possible to infer the distance of the measurement coil(s) from the respective measurement track element. This distance can then be used to correct the frequency of the measurement coil, for example. All in all, the influence of tolerances on the measurement result can be almost neutralized.

The displacement sensor can be used to increase a measurement accuracy, since distance and tilt correction can be performed. Further, the displacement sensor can be manufactured inexpensively, since installation tolerances can be greater.

According to one embodiment of the disclosure, the measurement track element along the measurement path has a variable width. By way of example, the measurement track element can alter its width such that a sinusoidal measurement signal with reference to the measurement path is obtained. A frequency sinusoidally dependent on the path can be evaluated particularly easily (for example by applying an inverse trigonometric function).

According to one embodiment of the disclosure, the two correction track elements along the measurement path have a constant width. The correction track elements may be wider than the associated correction coils. By way of example, the correction coils along the measurement path may always be overlapped by the correction track elements completely.

According to one embodiment of the disclosure, the at least one measurement track element is arranged between the two correction track elements. If the correction track elements in the x direction (i.e. orthogonally in relation to the measurement path in the y direction) are arranged outside the measurement track elements, a large distance between the correction coils in the x direction is obtained, which increases the correction accuracy.

According to one embodiment of the disclosure, the at least one measurement coil is arranged between the two correction coils. If the correction coils in the x direction are arranged beside the measurement coil(s), the sensor element in the y direction, i.e. in the direction of the measurement path, can be kept particularly short. All in all, a maximum distance in the x direction can be obtained for a minimum possible design.

According to one embodiment of the disclosure, the induction element has two electrically conductive measurement track elements arranged beside one another, with reference to the measurement path, along the measurement path, wherein the sensor element has two measurement coils arranged beside one another, with reference to the measurement path, over the two electrically conductive tracks. In other words, the displacement sensor can comprise two measurement coils situated beside one another in the x direction.

According to one embodiment of the disclosure, the two measurement track elements are formed in the same manner in sections and the measurement track elements are arranged in a manner staggered relative to one another such that signals displaced relative to one another with reference to a measurement path position are induced in the respective measurement coils. By way of example, the two measurement track elements may be shaped such that the one measurement coil generates a sinusoidal measurement signal along the measurement path and the other measurement coil generates a cosinusoidal measurement signal (i.e. a sinusoidal signal shifted through 90°). From the quotient, the arctan function can be used to compute the path position.

According to one embodiment of the disclosure, a correction track element and a measurement track element run beside one another and are formed from an electrically conductive track. It is possible for a measurement track element and a correction track element to be provided by the same conductive structure on the induction element. The associated measurement coil and the associated correction coil may then be arranged along the measurement path sequentially. In this case, an area of the correction coil may be smaller than that of the measurement coils. By way of example, the correction coil can overlap just a portion of the conductive track that does not have a variable width.

According to one embodiment of the disclosure, a measurement coil is formed from two sub coils arranged at an interval beside one another with reference to the measurement path and arranged over two measurement track elements. A correction coil may be arranged between the two sub coils with reference to the measurement path (i.e. with reference to the x direction). In this case, it is possible for the correction coil in the y direction, i.e. along the measurement path, to be at an interval from the two sub coils. This correction coil may be arranged over a correction track element arranged between the two measurement track elements.

It is possible for two measurement coils arranged beside one another to be split into two sub coils each in this manner. Further, a correction coil arranged between the two sub coils with reference to the x direction may be provided for each of these measurement coils. In this manner, a particularly compact induction element can be realized, for example, since any combination of measurement coil and correction coil requires just one conductive track to be present (which then provides the two measurement track elements at the edge and the correction track element in the middle).

The correction coil in this case has its area and/or its extent in the x direction embodied smaller than the measurement coil, since the measurement coil overlaps the entire width of the conductive track (the two measurement track elements and the correction track element). The correction coil can be integrated into the sensor element so as to save space.

According to one embodiment of the disclosure, a correction track element is flanked by two measurement track elements, and the correction track element and the measurement track elements are formed from an electrically conductive track.

The electrically conductive track formed from the two measurement track elements (at the edge of said electrically conductive track) and the correction track element (in the middle of said electrically conductive track) can then have a minimal width equal to the width of the correction track element. By way of example, this minimal width may be approximately 30% larger than the width of the correction coils.

According to one embodiment of the disclosure, the displacement sensor is a linear displacement sensor. By way of example, the induction element may be arranged along a linear measurement path. The linear displacement sensor can be used, by way of example, to measure the spring-compression depth of a two-wheeled vehicle. Further, a linear displacement sensor of this kind can be used in a brake system. It is also possible for the gear position in an automatic transmission to be measured using a linear displacement sensor of this kind.

According to one embodiment of the disclosure, the displacement sensor is a rotation angle sensor. By way of example, the induction element may be arranged on a shaft around a rotation axis. A rotation angle sensor of this kind can be used for measuring a camshaft position. Similarly, a rotation angle sensor of this kind can be used to determine an angle of an eccentric shaft for variable valve adjustment. A rotation angle sensor of this kind can also be used as a rotor position sensor for an electric motor for an electric vehicle.

A further aspect of the disclosure relates to a method for determining a relative position of a sensor element and of an induction element of a displacement sensor as described above and below. By way of example, the method can be carried out by a controller, which may also be arranged on the sensor element.

According to one embodiment of the disclosure, the method comprises: measuring two correction frequency signals of the two correction coils; determining a distance of the respective correction coil from the induction element from the respective correction frequency signal; determining a distance of the at least one measurement coil from the induction element from the distances of the correction coils; measuring at least one measurement frequency signal of the at least one measurement coil; correcting the at least one measurement frequency signal based on the determined distance of the respective measurement coil; and determining the relative position from the corrected at least one measurement frequency signal.

An algorithm that carries out the method and that may be implemented in the controller as a computer program requires little computation power and can be mapped using a standard microcontroller.

BRIEF DESCRIPTION OF THE DRAWINGS

Embodiments of the disclosure are described below with reference to the appended drawings, neither the drawings nor the description being intended to be interpreted as limiting the disclosure.

The figures are merely schematic and not to scale. The same reference signs in the figures denote features that are the same or that have the same effect.

DETAILED DESCRIPTION

Figure 1:
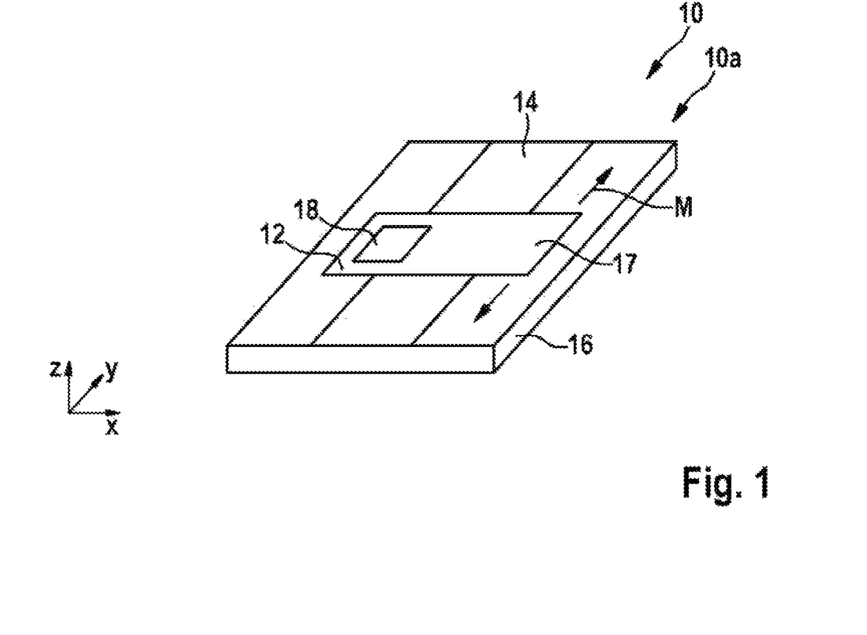
FIG. 1 schematically shows a linear displacement sensor according to an embodiment of the disclosure.

FIG. 1 shows a displacement sensor 10 in the form of a linear displacement sensor 10a comprising a sensor element 12 and an induction element 14. The sensor element 12 and the induction element 14 are displaceable relative to one another along a measurement path M. The design of the sensor element 12 and of the induction element 14 is explained even more precisely with reference to FIG. 3 to 9.

The induction element 14 may, by way of example, be a printed circuit board mounted on a part 16 whose relative position in relation to the sensor element 12 is supposed to be determined. Further, it is possible for the induction element 14 to be provided as a structure of an electrically conductive part 16.

The sensor element 12, which can also comprise a printed circuit board 17, may have a controller 18 on it that, as will be described later on, can use coils situated in the sensor element 12 to determine a path position of the sensor element 12 along the measurement path M.

In this figure and in subsequent figures, the measurement path M is oriented along a y direction, while a width direction is determined by the x direction. The distance of the sensor element 12 and of the induction element 14 is determined in a z direction.

Figure 2:
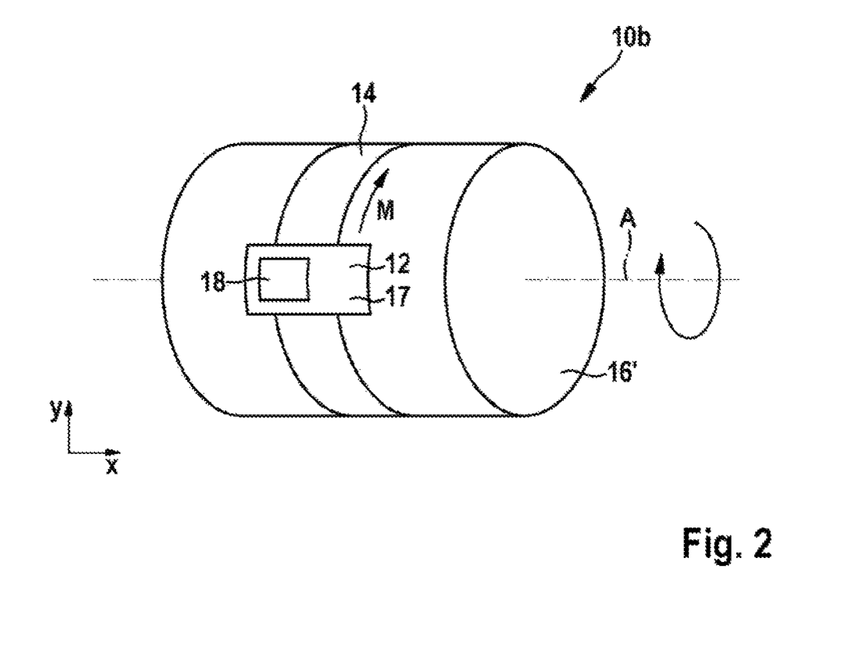
FIG. 2 schematically shows a rotation angle sensor according to an embodiment of the disclosure.

FIG. 2 shows a displacement sensor 10 in the form of a rotation angle sensor 10b comprising a sensor element 12 and an induction element 14. The sensor element 12 and the induction element 14 are rotatable relative to one another about an axis A. Since the induction element is wound around a shaft 16', this results in the sensor element 12 and the induction element 14 along a (curved) measurement path M being mobile in relation to one another.

The sensor element 12 and the induction element 14 (if notionally unwound from the shaft 16') may be designed just as in FIG. 1. By way of example, the induction element 14 may be a flexible printed circuit board and/or may be provided by means of structuring of the surface of the shaft 16', if the latter is electrically conductive.

In FIG. 1, the axis A is oriented in the x direction. The measurement path M runs (locally) in the y direction, assuming that the shaft 16' rotates and the sensor element 12 is stationary.

Figure 3:
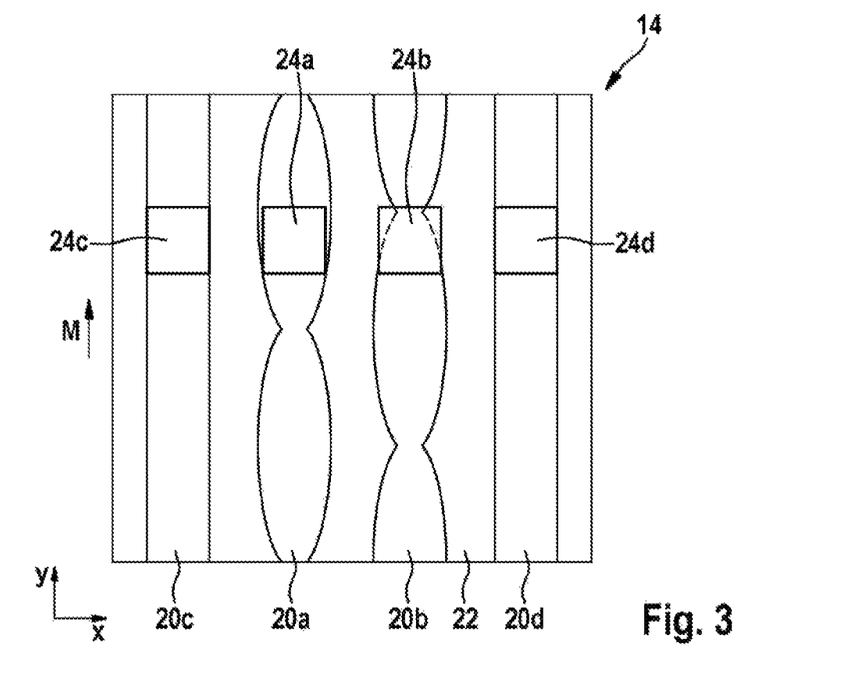
FIG. 3 schematically shows an induction element for a displacement sensor according to an embodiment of the disclosure.

FIG. 3 shows an induction element 14 comprising, by way of example, a (flexible) printed circuit board 22 on which multiple electrically conductive track elements 20a, 20b, 20c, 20d are used up as metallization layers or conductor tracks. It is also possible for the tracks 20a, 20b, 20c, 20d to be formed as rises or hollows on an electrically conductive part 16, 16'.

In the case of the linear displacement sensor 10a, the induction element 14 is flat. In the case of the rotation angle sensor 10b, the conduction element 14 is curved to form a circle or to form an arc (if only part of 360° is supposed to be captured).

The track elements 20a to 20d are divided into two measurement track elements 20a, 20b and two correction track elements 20c, 20d. The two measurement track elements 20a, 20b run beside one another and/or in the direction of the measurement path M (i.e. in the y direction). Further, the measurement track elements 20a, 20b run between the two correction track elements 20c, 20d, which also run in the direction of the measurement path.

Furthermore, each track element 20a, 20b, 20c, 20d has a measurement coil 24a, 24b, 24c, 24d over it that is associated with the track element. The measurement track elements 20a, 20b have a respective measurement coil 24a, 24b over them. The correction track elements 20c, 20d have a respective correction coil 24c, 24d over them. The measurement coils 24a, 24b and the correction coils 24c, 24d are arranged beside one another (in the x direction), the measurement coils 24a, 24b being arranged inside the two correction coils 24c, 24d. Further, all coils 24a, 24b, 24c, 24d may be of the same size or have the same area.

The measurement track elements 20a, 20b are structured such that the overlap of the associated measurement coils changes as the shaft 16' rotates and the part 16 moves. The width of each measurement track element 20a, 20b in the x direction changes along the y direction in this case such that the overlap of the associated measurement coils 24a, 24b along the y direction or along the measurement path changes. In this manner, each measurement coil 24a, 24b generates a measurement signal that is substantially dependent on the position of the respective measurement coil 24a, 24b on the measurement path M.

The edge of each measurement track element 20a, 20b may be curved outward (in the x direction or counter to the x direction) in sections, so that an arcuate structure is produced that repeats periodically. It is also possible for each measurement track element 20a, 20b to be mirror-image symmetrical with reference to a central axis running parallel to the measurement path.

The two measurement track elements 20a, 20b may be shaped equally in sections, but displaced in relation to one another along the measurement path M, so as to generate different measurement signals in the correction coils 24a, 24b. As shown, the measurement track elements 20a, 20b may be displaced by half of one period, resulting in measurement signals with a maximum difference.

The correction track elements 20c, 20d do not have to be structured and can have a geometry that is independent of the rotation/displacement or the measurement path. Only the correction coils 24c, 24d should always have the same overlap with the correction track elements 20c, 20d along the measurement path (for example complete overlap). In this manner, the correction coils 24c, 24d generate a measurement signal that is independent of the measurement path but that is dependent on the distance (in the z direction) of the respective correction coil 24c, 24d from the induction element 14.

It is possible to dispense with separate correction track elements 20c, 20d for the correction coils 24c, 24d and to arrange the correction coils 24c, 24d over an area of an electrically conductive part 16, 16'.

Figure 4:
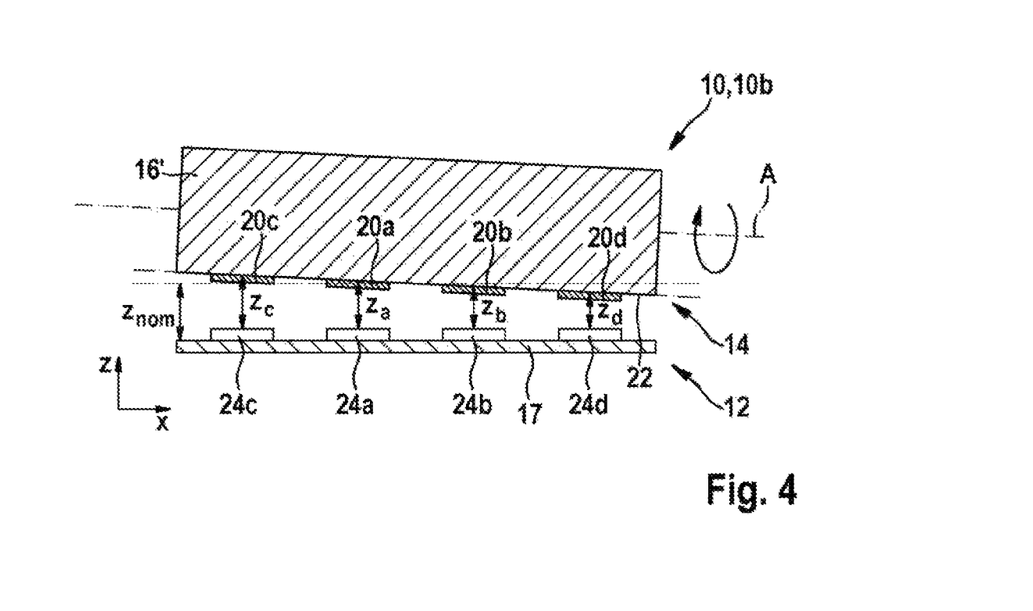
FIG. 4 shows a schematic cross section through a displacement sensor according to an embodiment of the disclosure.

FIG. 4 shows a cross section through a displacement sensor 10 (in the form of a rotation angle sensor 10b) at which a tilt in the sensor element 12 vis a vis the induction element 14 is shown. The distance of the coils 24a to 24d differs from a nominal distance $z_{nom}$, resulting in the measurement signals of the measurement coils 24a, 24b being distorted, but being able to be corrected by the measurement signals of the correction coils 24c, 24d.

Figure 5:
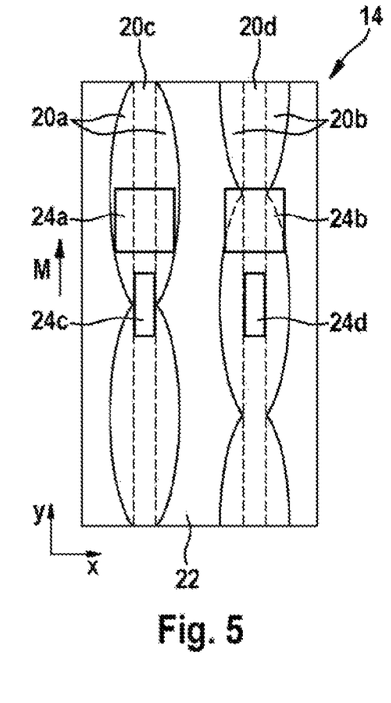
FIG. 5 schematically shows an induction element for a displacement sensor according to an embodiment of the disclosure.
Figure 6:
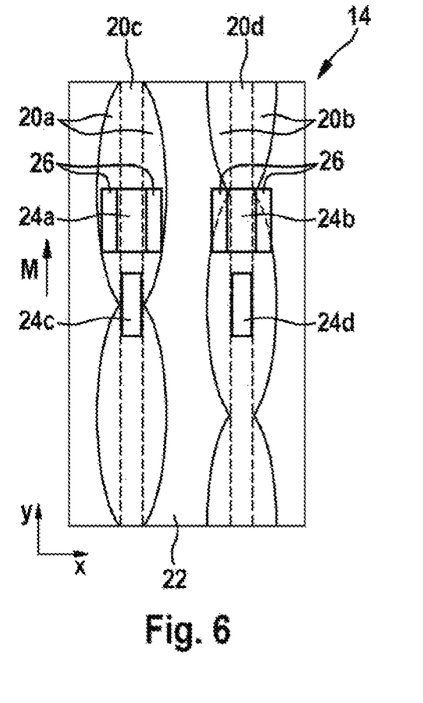
FIG. 6 schematically shows an induction element for a displacement sensor according to an embodiment of the disclosure.

FIG. 5 and FIG. 6 show further embodiments of induction elements 14 in the case of which a correction track element 20c, 20d and measurement track elements 20a, 20b are integrated in one another.

In FIG. 3, the correction track elements 20c, 20d and measurement track elements 20a, 20b are each provided by a separate electrically conductive track (i.e. a track separated from the other tracks). In FIGS. 5 and 6, electrically conductive tracks having the same shape as the measurement track elements 20a, 20b from FIG. 3 are divided into two measurement track elements 20a (or 20b) and a correction track element 20c (or 20d) in each case. It is intended to be understood that this division takes place as a result of the arrangement of the coils 24a to 24d, and the two measurement track elements 20a (or 20b) and the correction track element 20c or 20d can be connected to one another or can be provided by a single metallization layer. However, it is also possible for the measurement track elements 20a (or 20b) and the correction track element 20c (or 20d) to be separate from one another.

Just as in FIG. 3, one edge of each measurement track element 20a, 20b may in this case be curved outward (in the x direction or counter to the x direction) in sections, so that an arcuate structure is produced that repeats periodically. The other edge may be straight or run parallel to the measurement path in this case.

All in all, the width of the track formed from the measurement track elements 20a (or 20b) and the correction track element (20c or 20d) can change periodically between a minimum width and a maximum width along the measurement path. The minimum width may be the width of the correction track element 20c (or 20d) in this case.

In FIG. 5, the measurement coil 24a (or 24b) overlaps the associated measurement track elements 20a (or 20b) and correction track elements 20c (or 20d) completely in the width direction (x direction). The measurement coil 24a (or 24b) may in this case be just as wide as the maximum width of the track formed from the associated track elements.

The correction coil 24c (or 24d) overlaps just the correction track element 20c (or 20d) in the width direction (x direction). The correction coil 24c (or 24d) may in this case be just as wide or a little narrower as/than the minimum width of the track formed from the associated track elements.

The measurement coils 24a, 24b are arranged beside one another in the x direction. The correction coils are also arranged beside one another in the x direction. In this case, the correction coils in the y direction or in the direction of the measurement path M are at a distance from the measurement coils 24a, 24b.

In FIG. 6, in which the arrangement of the coils 24a to 24d and the shape of the correction coils 24c, 24d is just as in FIG. 5, each of the measurement coils 24a, 24b is divided into two sub coils 26 in each case. Each of the sub coils 26 is in this case approximately as wide as the maximum width of the associated measurement track element 20a or 20b. In this manner. The range of the measurement signal that is delivered by a measurement coil 20a, 20b can be increased. In particular, the minimum measurement signal is reduced in comparison with the design from FIG. 4.

Figure 7:
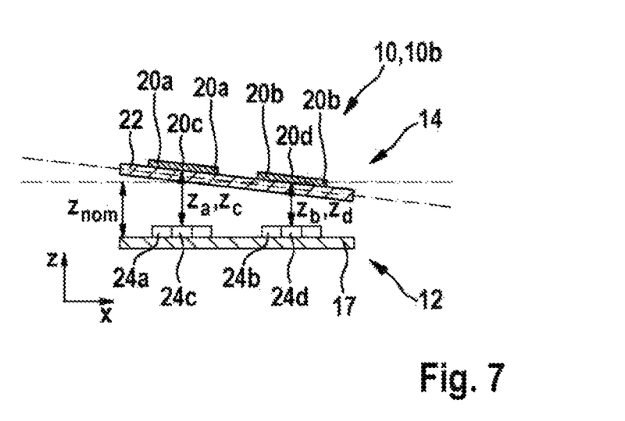
FIG. 7 shows a schematic cross section through a displacement sensor according to an embodiment of the disclosure.

FIG. 7 shows a cross section through a displacement sensor 10 in the form of a linear displacement sensor having an induction element 14 and a coil design from FIG. 6. Analogously to FIG. 4, it shows that the distance of the coils 24a to 24d can differ from a nominal distance $z_{nom}$ on the basis of a tilt.

FIG. 7 further shows that the measurement track elements 20a, 20b and the correction track elements 20c, 20d may be arranged on the opposite side of the printed circuit board 22 from the sensor element 12. It is also possible for the measurement track elements 20a, 20b and the correction track elements 20c, 20d to be arranged on that side of the printed circuit board 22 that faces the sensor element 12.

It is possible for both a linear displacement sensor 10a and a rotation angle sensor 10b to be able to have a design consistent with FIG. 3, 5 or 6.

Figure 8:
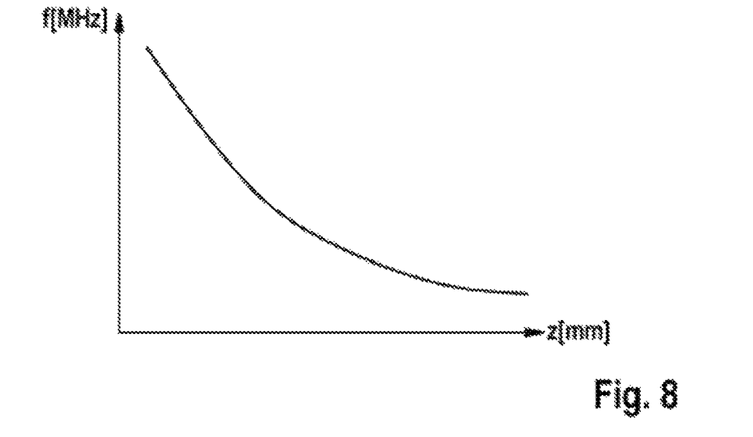
FIG. 8 shows a graph illustrating a dependency of a frequency on a distance between an induction element and a coil.
Figure 9:
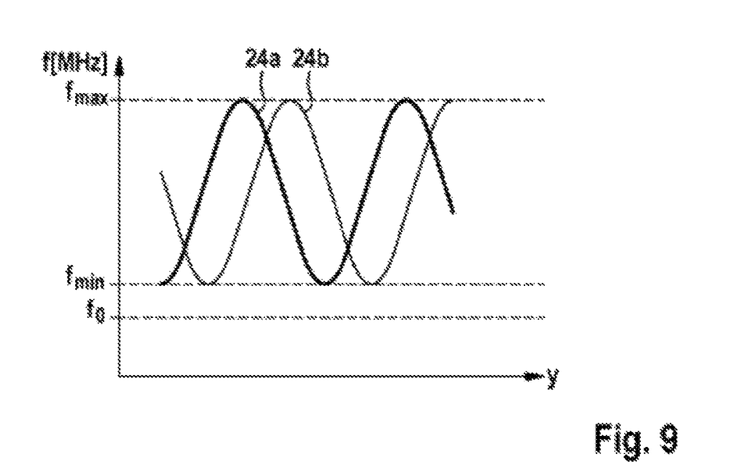
FIG. 9 shows a graph illustrating a dependency of a frequency on a measurement path.

Referring to FIGS. 8 and 9, a method is described that the controller 18 can perform in order to ascertain what position on the measurement path M the sensor element 12 is in in relation to the induction element 14.

The measurements coils 24a, 24b and the correction coils 24c, 24d may be connected to a respective resonant circuit that is excited into oscillation by the controller 18. The frequency of the respective resonant circuit is dependent on the inductance of the respective coil 24a to 24d, which is in turn dependent on the overlap between the respective coil and its associated track elements 20a to 20d. These frequencies are captured by the controller 18 as a measurement signal.

First of all, the controller can measure the frequencies of the two correction coils 24c, 24d at run time and use these frequencies to infer the distances $z_c$, $z_d$ (see FIG. 4, 7) between the induction element 14 and the respective correction coil 24c, 24d. FIG. 8 shows a graph with the correlation between the frequency of a coil 24a to 24d and the distance thereof from the induction element 14. From this correlation, which can be interpolated in the controller 18 or may be stored as a table, for example, the controller 18 can compute a distance from a frequency (and vice versa).

From the known geometry of the displacement sensor 10 and in particular the positions of the coils 24a to 24d in the x direction, the distances $z_a$, $z_b$ can be determined from the distances $z_c$, $z_d$. In the embodiment of FIG. 4, in which the correction coils 24c, 24d are placed externally beside the measurement coils 24a, 24b, this can be accomplished by means of a linear interpolation. In the embodiment of FIG. 7, the distances can be equated ($z_a = z_d$ and $z_c = z_d$), since the correction coil 24c, 24d is arranged at the same position as the measurement coil 24a, 24b with reference to the x direction.

Using the distances $z_a$, $z_b$, the controller can now correct the measured frequency of the measurement coils in each case.

FIG. 9 shows a graph showing the measurement signals of the measurement coils 24a, 24b as generated by the measurement coils 24a, 24b without tilt (i.e. during calibration).

In this case, $f_0$ is a minimum frequency produced when no overlap occurs (for example when the induction element 14 is remote). The minimum frequency $f_0$ is dependent on the coil geometry and the resonant capacitance (and not on the distance and on the induction element 14) and can be ascertained by means of calibration.

$F_{min}(z_{nom1,2})$ is the frequency for minimum overlap (at the nominal distance $z_{nom1,2}$) and $f_{max}(z_{nom1,2})$ is the frequency for maximum overlap (at the nominal distance $z_{nom1,2}$). The nominal distance $z_{nom1}$ of the first correction coil 24a and the nominal distance $z_{nom2}$ of the second correction coil 24b are defined by design and scatter among components and can be ascertained by means of calibration. By moving the entire measurement range during calibration, the controller can ascertain the minimum frequency $f_{max}(z_{nom1,2})$ and the maximum frequency and $f_{max}(z_{nom1,2})$ of each measurement coil 24a, 24b.

From the distance $z_a$, $z_b$ of the measurement coils 24a, 24b that is ascertained by means of the correction coils 24c, 24d, the controller 18 can now determine the (corrected) frequency of the respective measurement coil 24a, 24b for maximum overlap $f_{mxx}(z_{a,b})$ at this distance. This can be accomplished using the correlation shown in FIG. 8.

The measured frequencies $f_{m1,2}$ of the measurement coils can now be corrected using these corrected maximum frequencies $f_{max}(z_{a,b})$, for example using a linear correction as per $$f_{cor1,2} = (f_{m1,2} - f_0)/(f_{max}(z_{a,b}) - f_0 * f_{max}(z_{nom1,2})$$

From the corrected frequencies $f_{cor1,2}$, the controller 18 can then determine the position y on the measurement path. By way of example, the measurement track elements 20a, 20b may be shaped such that a sinusoidal measurement signal via the measurement path M is obtained. Further, the measurement track elements 20a, 20b may be offset from one another in the direction of the measurement path M such that measurement signals shifted through 90° are obtained. It is then possible for $$y = \arctan(f_{cor1}/f_{cor2})$$

to be used to compute the path position or the rotation angle y from the corrected frequencies $f_{cor1,2}$. As a result of the correction, this result is concordant with a comparable result at the time of a calibration.

Finally, it should be pointed out that terms such as "having", "comprising", etc. do not exclude other elements or steps and terms such as "a" or "an" do not exclude a multiplicity. Reference signs in the claims are not intended to be regarded as limitation.

The invention claimed is:

1. A displacement sensor, comprising:
   an induction element including:
      at least one electrically conductive measurement track element running along a measurement path; and
      two electrically conductive correction track elements positioned beside each other with reference to the measurement path; and
   a sensor element movable relative to the induction element along the at least one measurement track element, and including:
      at least one measurement coil positioned over the at least one measurement track element, wherein a movement of the sensor element relative to the induction element along the at least one measurement track element changes an overlap between the at least one measurement coil and the at least one measurement track element along the measurement path such that an induction of the at least one measurement coil is configured with reference to a position of the at least one measurement coil on the measurement path; and
      two correction coils positioned beside each other with reference to the measurement path, such that each correction coil is positioned over a respective one of the two correction track elements, and such that an overlap between each correction coil and the respective one of the two correction track elements along the measurement path is constant.

2. The displacement sensor as claimed in claim 1, wherein at least one of:
the at least one measurement track element along the measurement path has a variable width; and
the two correction track elements along the measurement path have a constant width.

3. The displacement sensor as claimed in claim 1, wherein at least one of:
the at least one measurement track element is positioned between the two correction track elements; and
the at least one measurement coil is positioned between the two correction coils.

4. The displacement sensor as claimed in claim 1,
wherein the induction element includes two electrically conductive measurement track elements positioned beside each other with reference to the measurement path, along the measurement path; and
wherein the sensor element includes two measurement coils positioned beside each other, with reference to the measurement path, and positioned over the two electrically conductive measurement track elements.

5. The displacement sensor as claimed in claim 4, wherein:
the two measurement track elements are formed in a same manner in sections; and
the two measurement track elements are arranged in a manner staggered relative to each other such that measurement signals induced in the respective measurement coils are displaced relative to each other with reference to a measurement path position.

6. The displacement sensor as claimed in claim 1, wherein at least one of:
one correction track element of the two correction track elements and one measurement track element of the at least one measurement track element run beside each other and are formed from an electrically conductive track; and
one measurement coil of the at least one measurement coil and one correction coil of the two correction coils are positioned along the measurement path sequentially.

7. The displacement sensor as claimed in claim 4, wherein at least one of:
one of the two measurement coils is formed from two sub coils positioned at an interval beside each other with reference to the measurement path and positioned over the two measurement track elements;
one of the two correction coils is positioned between the two sub coils with reference to the measurement path, and is positioned over a one of the two correction track elements that is positioned between the two measurement track elements; and
one of the two correction track elements is flanked by the two measurement track elements, and the one of the two correction track elements and the two measurement track elements are formed from an electrically conductive track.

8. The displacement sensor as claimed in claim 1, wherein the displacement sensor is a linear displacement sensor and the measurement path is a linear measurement path.

9. The displacement sensor as claimed in claim 1, wherein the displacement sensor is a rotation angle sensor and the induction element is arranged on a shaft around a rotation axis.

10. A method for determining a relative position of a sensor element and of an induction element of a displacement sensor, comprising:
measuring two correction frequency signals of two correction coils positioned beside each other on the sensor element with reference to a measurement path such that each of the two correction coils is positioned over a respective one of two correction track elements positioned beside each other on the induction element with reference to the measurement path, and such that an overlap between each of the two correction coils and the respective one of the two correction track elements along the measurement path is constant;
determining a distance of each correction coil from the induction element using a corresponding one of the two correction frequency signals;
determining a distance of at least one measurement coil from the induction element using the determined distances of the two correction coils, the at least one measurement coil positioned on the sensor element over at least one electrically conductive measurement track element of the induction element running along the measurement path, wherein a movement of the sensor element relative to the induction element along the at least one measurement track element changes an overlap between the at least one measurement coil and the at least one measurement track element along the measurement path such that an induction of the at least one measurement coil is configured with reference to a position of the at least one measurement coil on the measurement path;
measuring at least one measurement frequency signal of the at least one measurement coil;
correcting the at least one measurement frequency signal with reference to the determined distance of each measurement coil; and
determining a relative position of the sensor element with respect to the induction element using the corrected at least one measurement frequency signal.

* * * * *